May 5, 1959 J. S. COOK 2,885,593

COUPLED LINES SYSTEMS

Filed Dec. 7, 1954

INVENTOR
J. S. COOK
BY Arthur J. Torsiglieri
ATTORNEY

United States Patent Office 2,885,593

Patented May 5, 1959

2,885,593

COUPLED LINES SYSTEMS

John S. Cook, New Providence, N.J., assignor to Bell Telephone Laboratories, Incorporated, New York, N.Y., a corporation of New York Application December 7, 1954, Serial No. 473,513

18 Claims. (Cl. 315—3.6)

Figure 3:
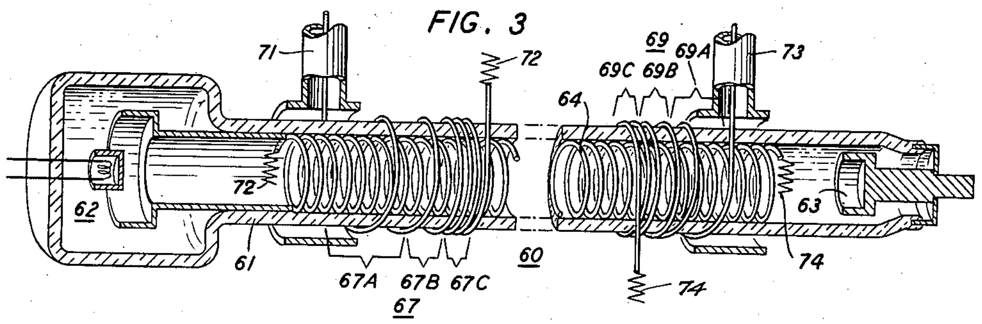

This invention relates to coupled transmission line systems.

An object of the invention is to excite in a convenient manner a pair of coupled transmission lines in a pure normal mode.

A normal mode of a pair of coupled lines can be defined as a field distribution associated jointly with the two lines which will propagate sinusoidally with distance and time and whose peak amplitude is independent of time and the coordinate in the direction of wave propagation. In particular, a pair of coupled lines will be characterized by two normal modes in the forward direction and two in the backward direction. Only the former will be considered hereinafter. Of these, one designated as the in-phase mode corresponds to a fiield distribution in which the excitation is in phase in the two lines while the other, the out-of-phase mode, corresponds to a field distribution in which the excitation is out of phase in the two lines. Any field distribution can be shown to be a superposition of the two normal modes. In my copending application Serial No. 465,578, filed October 29, 1954, there are set forth the advantages of operation in a normal mode for coupled line systems. In particular, it is characteristic that if a coupled system be excited in a pure normal mode, the other normal mode will remain unexcited so long as the ratio of the difference in phase propagation constants of the two lines to the coupling coefficient is a constant. This condition will be described as the absence of hypercoupling between the two lines. It is also pointed out therein that in general if only a single one of two coupled lines which have a finite difference in phase propagation constants and substantially uniform coupling is excited from an input source in the usual manner, both normal modes will be set up in the coupled system.

The present invention is based to a large extent on the recognition that if a first pair of coupled lines is excited initially to set up both normal modes, there is a point therealong at which the field distributions associated therewith correspond to those of a pure normal mode of a second pair of coupled lines of different propagating characteristics so that if a connection is there made from the first pair to such a second pair of coupled lines, a pure normal mode will be set up in the second pair of lines.

It is characteristic that a wave introduced in the usual manner to excite both normal modes into one of a pair of coupled lines propagates with a velocity different from that which it would have if the one line had been uncoupled from the other and that the amplitude of the wave energy in the one line varies sinusoidally both with time and distance exhibiting a phenomenon described as spatial beating and characterized by a beat wavelength. This is the result of excitation of both normal modes which have different phase velocities so that beating therebetween results. This beat wavelength is defined in this specification as the distance that corresponds to the separation of two adjacent points of maximum power transfer along one line. This beat wavelength is dependent on the frequency of operation, the characteristic phase velocities of the two lines, and the coupling coefficient. The propagation properties that one of two coupled lines would have in the absence of coupling with the other will for convenience be described as its characteristic propagation properties. When two coupled lines have uniform but different characteristic phase velocities, there is not a complete power transfer between the two lines and the maximum amount of energy which is transferred is dependent on the relative characteristic phase velocities thereof. This transfer, nevertheless, is a maximum at a point which is at a half the beat wavelength from the start of the coupled region. Moreover, it is found that at this point the field distribution associated with the two lines corresponds to a point of pure normal mode of a pair of coupled lines having a given set of characteristics relative to those of the first pair of coupled lines.

It is in accordance with the invention to use as a means for launching a pure normal mode into a pair of coupled lines a half beat wavelength section in which the relative phase velocities of the two lines forming this section and the coupling therebetween are chosen to result in the excitation of a pure normal mode in the pair. Viewed in a somewhat different aspect, a normal mode may be excited in a pair of coupled transmission lines by associating therewith a properly designed transducer section as an extension of the pair of coupled lines and applying an input wave to the end of one of the two lines forming the transducer section. In particular, the two lines forming the transducer section must be chosen to have different average characteristic phase propagation constants. The faster of the two normal modes of the coupled transmission lines may be launched therein by exciting the component line of the input transducer section having the faster average characteristic phase velocity and conversely the slower normal mode may be launched by exciting the input transducer line having the slower average characteristic phase velocity. Similarly, from reciprocity considerations, the faster of two lines forming an output transducer section will be excited selectively when the faster normal mode is in the main coupled line, and the slower line when the slower mode is in the main coupled line.

The invention has special application to traveling wave tubes and is most readily described with specific reference thereto. One important use is in traveling wave tubes of the kind which employ as the interaction circuit a pair of concentric helices of different diameters and contrawound. As is discussed in the United States patent to C. F. Quate, No. 2,823,333, granted February 11, 1958, such tubes are of two main types. In tubes of the first type intended primarily for high efficiency operation and described as of the longitudinal field type the concentric helices are advantageously operated so that at corresponding axial positions the radio frequency potentials on the two helices are substantially equal and of the same polarity. This is known as the in-phase mode for a wave propagating along the concentric helices and corresponds to the faster of the two normal modes characteristic of the coupled transmission line system formed by the two helices. In tubes of the second type which usually are intended primarily for low noise and described as of the transverse field type, the concentric helices are advantageously operated so that at corresponding axial positions the radio frequency potentials on the two helices are substantially equal but of opposite polarity. This is known as the out-of-phase mode for a wave propagating along the concentric helices and corresponds to the slower of the two normal modes characteristic of the coupled transmission line system formed by the two helices. Reference can be had to this last-mentioned copending application for a more detailed description of the principles of operation and advantages of each of the two types. However, one of the big problems in the use of such tubes has been the difficulty in exciting the interaction circuit in substantially only the desired of the two normal modes at one time, the particular mode being chosen with respect to the type of operation intended.

In the aforementioned Quate patent, there is described a technique for exciting a pure normal mode in such concentric helix type traveling wave tubes which is based on the principles of normal mode tapering. This technique achieves its broad band characteristics by avoiding excitation of any but the desired mode in the transducer section, and depends on the reorientation of the field distribution between two lines associated with the pure normal mode excited. However, this technique, although effective, requires a transducer section at each end of the wave circuit which is relatively long and at least a local beat wavelength long. This adds undesirably to tube length. The practice of the present invention makes possible realization of good coupling over nearly as wide a band as that provided by the normal mode tapering technique but with considerable economy of tube length over that technique.

In accordance with an illustrative embodiment of the invention, a traveling wave tube of the type utilizing an interaction circuit formed by a pair of concentric helices which are advantageously operated in a pure mode, coupling to or from such a circuit is achieved by a transducer section comprising a half beat wavelength of the two helices, the pitch of the helices along this transducer section being related in a prescribed manner to the pitches of the helices along the interaction circuit such that excitation of the end of one helix of the transducer section results in normal mode excitation of the interaction circuit. In a longitudinal field tube which depends on interaction with the faster in-phase normal mode, the helix having the faster characteristic phase velocity of the two helices forming the transducer is excited directly. In the transverse field tube, the helix having the slower characteristic phase velocity is excited initially.

As indicated above, from reciprocity considerations, a half beat wavelength transducer section of the kind described can be employed for transferring energy which is propagating in substantially a pure normal mode in a pair of coupled lines into a single one of the pair of lines forming the half beat wavelength transducer section. Accordingly, in the illustrative embodiment mentioned above, at the output end of the interaction circuit of the traveling wave tube the energy propagating in a pure mode on the interaction circuit may be concentrated into a single line for transmission to an external line by a similar transducer section.

Moreover, by the use of two appropriate transducer sections essentially back to back there can be effected substantially complete directional power transfer between a pair of coupled lines. In such an application the first transducer section is used to transfer energy applied solely to the first of its two component lines into a normal mode excitation of the extensions of the two component lines and the second transducer section is used to transfer the normal mode excitation on the two component lines completely into wave energy on the one of its component lines which forms an extension of the second component line of the first transducer section.

This technique, too, finds special application to traveling wave tubes. In this case, it permits complete power transfers to and from a circuit comprising a single wire helix. In an illustrative embodiment of this kind, in a traveling wave tube of the type utilizing a helix for the interaction circuit, coupling to the circuit is achieved by a transducer comprising a helix coaxial with and overlapping an end portion of the helix circuit, characterized both by a first portion a half beat wavelength long adapted to transfer energy applied to one end thereof into normal mode excitation of the two helices at the end of this first portion and by a second portion a half beat wavelength long adapted to transfer the normal mode excitation on the coupled helices into excitation of only the circuit helix. A similar transducer is employed at the other end for abstracting the energy on the circuit helix into an output line. In transducers of this kind, it is found advantageous to include between the first and second half beat wavelength portions a portion substantially one sixth of a beat wavelength along which the two lines have substantially the same characteristic phase propagation constants.

Figure 1:
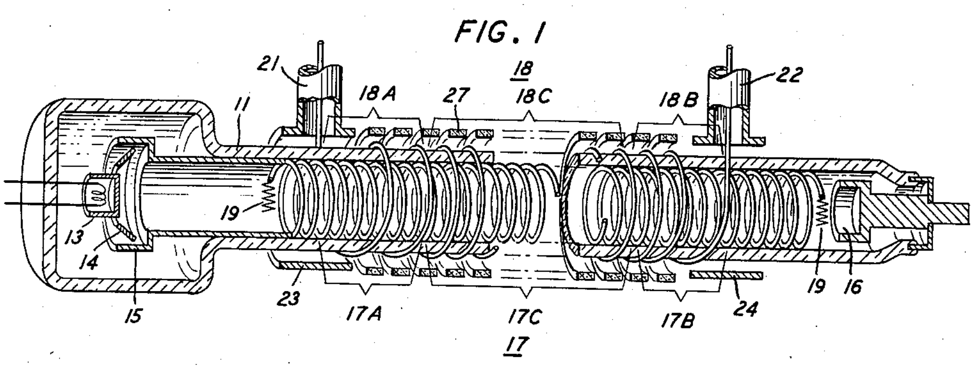
Figure 2:
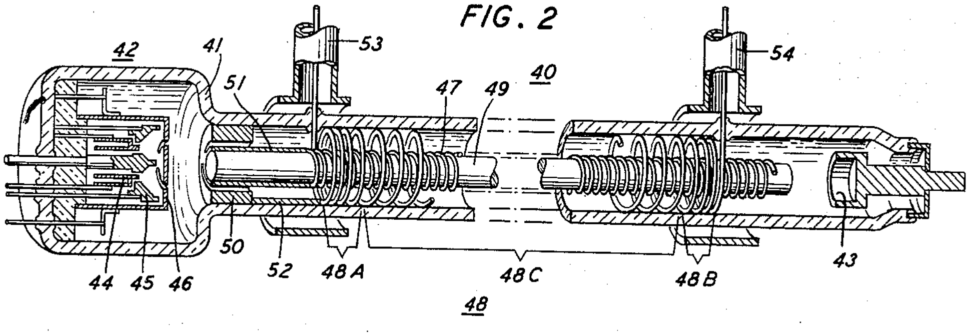

The invention will be better understood from the following description taken in conjunction with the accompanying drawings in which:

Fig. 1 shows in longitudinal cross section a longitudinal field type traveling wave tube employing a pair of helices as the interaction circuit which includes at the input and output connections transducer sections in accordance with one illustrative embodiment of the invention;

Fig. 2 shows similarly a transverse field type tube employing a pair of helices as the interaction circuit which utilizes transducer coupling connections in accordance with an illustrative embodiment of the invention; and Fig. 3 shows in longitudinal cross section a single helix type traveling wave tube which utilizes transducer coupling connections in accordance with a further illustrative embodiment of the invention.

In the traveling wave tube 10 shown schematically in longitudinal cross section in Fig. 1, an evacuated envelope 11, for example, of glass, houses various tube elements. At one end, an electron gun comprising a cathode 13, beam forming electrode 14 and accelerating anode 15 serves as the source of a solid cylindrical beam of circular cross section. By lead in connections from a voltage source (not shown) the beam forming electrode is maintained at a negative potential and the accelerating anode at a positive potential with respect to the cathode. At the opposite end, a target 16 also maintained at a positive potential with respect to the cathode serves to collect the spent electrons. Supported by the wall of the elongated portion of the tube envelope is the first conductive helix 17 which advantageously is of uniform pitch and diameter and aligned to be coaxial with the electron beam. A second conductive helix 18 is wound with a uniform diameter but in a sense opposite to that of the inner helix 17 on the outside of envelope 11 and coaxial with the inner helix. The outer helix 18 comprises three portions. The two short end portions 18A and 18B are wound with a pitch which corresponds to a characteristic phase velocity of the inner helix faster than that of the outer helix. The longer intermediate portion 18C is wound to a pitch which corresponds to a characteristic phase velocity therealong substantially equal to that of the inner helix. Such a portion where the characteristic phase velocities of the two helices are substantially equal will be described as synchronous. The two end portions 18A and 18B, together with their corresponding portions of the inner helix 17A and 17B, respectively, form the input and output transducers, respectively, and the intermediate portion 18C and its corresponding portion 17C of the inner helix form the interaction circuit which in accordance with traveling wave tube principles is a plurality of operating wavelengths long. The inner helix 17 advantageously is extended at its two ends beyond the length of the outer helix, and such ends are made substantially reflectionless by the introduction of lossy material shown schematically as the resistive terminations 19.

The end of the helix 17 adjacent the accelerating anode of the electron gun advantageously is connected thereto whereby there is provided the D.-C. accelerating potential along the path of flow of the electron beam. This accelerating potential is chosen to provide an electron velocity which is substantially equal to the axial velocity of the in-phase mode of the field distribution propagating along the interaction circuit corresponding to portions 17C and 18C of the helices.

The ends of the outer helix 18 are coupled to transmission lines 21 and 22 which lead to an input source and a load, respectively. Such transmission lines advantageously are coaxial cables, the inner conductors of which are connected to the ends of the outer helix and the outer conductors of which connect to cylindrical collars 23 and 24 which fit around the tube envelope in the neighborhood of the junctions between the helix ends and the inner conductors of the coaxial lines. Alternatively, the ends of the outer helix 18 can be used to excite input and output hollow wave guides in the manner well known to workers in the art.

It is in accordance with the invention that the transducer sections 17A, 18A and 17B, 18B are each substantially half a beat wavelength long at the midfrequency of the operating band. Moreover, the relative pitches of portions 17A and 18A are chosen such that excitation from the input line 21 results in a field distribution at their ends in which the radio frequency potentials on helices 17 and 18 are equal in phase and magnitude. Since therebeyond along the interaction circuit helix portions 17C and 18C are synchronous, the radio frequency pontentials on the helices 17 and 18 at corresponding axial positions remain equal in phase and magnitude, which corresponds to a pure in-phase mode. This is as desired and results in interaction of high efficiency between the electron beam and the propagating radio frequency energy whereby high gain is realized. If the output transducer 17B, 18B is made similar to the input transducer 17A, 18A reciprocity dictates that the in-phase mode excitation on the interaction circuit 17C, 18C be transferred completely to the outer helix at the end coupled to the output line 22.

There is set forth below briefly the design considerations applicable to the transducer sections for achieving the field distribution desired for pure in-phase excitation.

Let $\beta_i$ be the characteristic propagation constant of the inner helix which is uniform along its length. This will also be the characteristic propagation constant of the intermediate portion of the outer helix since along the interaction circuit the two helices are synchronous. Let $\beta_0$ be the characteristic propagation constants of the end portions of the outer helix. In the tube depicted, the pitch of the end portion of the outer helix is shown as uniform with a relatively sharp discontinuity in pitch over the transition region to the uniform different pitch characteristic of the intermediate portion. It may be convenient for avoiding reflections in some cases to make the transition less abruptly, and in such cases $\beta_0$ is more accurately defined as the average or effective characteristic propagation constant of the transducer section of the outer helix. It will simplify the equations to be described if the ratio of $\beta_0$ to $\beta_i$ be defined as $\alpha$. Then there are measured the propagation constants of the fast and slow modes associated with the synchronous portion of the coupled helices. These are designated, respectively, as $\beta_f$ and $\beta_s$. These can either be calculated from the dimensions of the two helices, or more readily, may be found experimentally by projecting an electron beam therepast and discovering the two beam velocities which result in amplification of a wave propagating along the coupled helices. After $\beta_s$ and $\beta_f$ have been found, there is derived the parameter $\Phi$ which is given by $$-ln\frac{\beta_s-\beta_f}{2\beta_i}$$

The pitch of the outer helix of the transducer portion is then chosen for a value of $\alpha$ which approximately satisfies the relation that $\Phi$ equal $$ln\frac{4\alpha}{\frac{(1-\alpha)^2}{1+\alpha}}$$

After $\alpha$ has been determined, the beat wavelength $\lambda_b$ for a coupled system in which there is a maximum of half power transfer is calculated in accordance with the relation that $$\lambda_b=\frac{2\Pi}{\sqrt{2}\beta_i|1-\alpha|}$$

Then the transducer section is adjusted to be half a beat wavelength long.

Briefly, a tube of this kind would be designed as follows: First, there is decided the diameters and pitches of the two helices along the synchronous portion with which is is desired to operate. The considerations applicable are those applicable to the interaction circuits generally of tubes of this kind. It is important to coordinate the diameter sizes and pitches to the frequency of operation to insure a high impedance to the beam. It is to be borne in mind that a circuit of this kind is more dispersive than a single wire helix so that its frequency range of useful operation is narrower than that of a single wire helix. It is also important that the phase velocity of the fast mode of the coupled helices with which the beam is to interact is sufficiently low that electron velocities substantially equal thereto are feasible. Thereafter, from the relationships set forth above, there can be designed suitable transducers for use at the input and output coupling connections.

In the tube shown in Fig. 1, it is also necessary to make the interaction circuit lossy, at least in the direction from the output end to the input end. To this end, for example there is positioned surrounding the outer helix 18 a helical section 27 of ferrite material of the kind which exhibits gyromagnetic resonance. As described in copending application Serial No. 362,177, filed June 17, 1953, by R. Kompfner said H. Suhl, such a helical ferrite when positioned in a longitudinal magnetic field can be made to provide unidirectional loss to a helical conductor. The longitudinal magnetic field is provided by flux producing auxiliary equipment (not shown). The longitudinal magnetic field is also used to provide focusing action on the electron beam in its flow axially along the tube.

Moreover, the focusing action may be achieved by the use of a spatially alternating axially symmetric longitudinal magnetic field. Such focusing is now described as periodic focusing and the principles thereof are set forth in an article published in the Proceedings of the Institute of Radio Engineers, volume 42, pages 800 through 810 (1954), entitled "Electron Beam Focusing With Periodic Permanent Magnet Fields." For use with such periodic fields, there is employed advantageously a succession of helical ferrite sections, successive sections being wound in an opposite sense to compensate for successive reversals of magnetic field direction whereby each section provides high loss in the one desired direction.

In the longitudinal field tube described, the transducer connections are adjusted to excite the in-phase mode on the interaction circuit. To this end, the outer helix to be coupled to the external transmission line was adjusted to have a characteristic phase velocity along its transducer portion faster than that of the inner helix therealong. It is feasible, however, to modify the design of the tube to excite instead initially the inner helix from the external input line. In such a case, the inner helix would be designed to have the faster characteristic phase velocity along the transducer section since the faster normal mode is to be excited. Moreover, it is unnecessary that the inner helix be uniform. Inasmuch as the relative difference in characteristic phase propagation of the transducer portion with respect to the interaction circuit portion is important, such difference can be realized by changes in the characteristic propagation constants of either the inner or outer helix, or both simultaneously. However, fabrication of the tube is simplified when the inner helix is made uniform.

As indicated earlier, if it be desired instead to excite the slower out-of-phase normal mode characteristic of the coupled helix circuit the component line of the transducer section having the slower characteristic phase velocity should be excited. This is done in the transverse field type tube 40 shown in Fig. 2. In this tube, an evacuated envelope 41 houses various tube elements. At one end thereof, an electron gun 42 provides an annular electron beam for travel axially through the envelope to the opposite end where it is collected by the target electrode 43. The electron gun 42 is of conventional design for providing an annular beam and comprises an annular cathode 44, a beam forming electrode 45, and an accelerating anode 46. Lead in connections (not shown) provide suitable accelerating potentials to the various elements.

As is described in the aforementioned copending Quate application, in a transverse field tube the electron beam is advantageously projected along a cylindrical surface of pure transverse field where there is no longitudinal field. Such a surface exists in the interspace between the inner helix 47 which is wound on a dielectric support 49 and positioned axially within the path of electron flow and the outer helix 48, which is wound in a sense opposite to that of helix 47 and supported by the inside wall of the envelope. The two helices 47 and 48 are advantageously maintained at the same positive D.-C. potential relative to the cathode to provide a purely longitudinal electrostatic accelerating field to the electrons traveling through the interspace. To serve as a connection for providing the accelerating potentials, a cylindrical conductive sleeve 50 is provided intermediate the electron gun and the helices. The sleeve 50 connects to the inner helix by way of extension arm 51 and to the outer helix by way of extension arm 52. The sleeve 50 is then connected by lead in conductors (not shown) to a suitable D.-C. voltage supply. The accelerating voltage is chosen to provide an electron velocity substantially equal to the axial velocity of the out-of-phase mode of the field distribution propagating along the interaction portion of the helices. The sleeve 50 also serves to intercept electrons in the beam which are appreciably displaced from the cylindrical surface of purely transverse radio frequency field. To this end, the sleeve is apertured along a cylindrical surface which is an extension of the cylindrical surface of pure transverse field in the interspace between helices 47 and 48. To avoid transverse components in the electron beam, the tube preferably is immersed in a longitudinal magnetic field provided by magnetic flux producing equipment (not shown).

As before, one of the two helices, for example, the inner helix again, is of uniform pitch and diameter along its length. The outer helix has an intermediate portion 48C of uniform pitch and diameter which results therealong in a characteristic phase velocity synchronous with the characteristic phase velocity of the inner helix. This portion, together with the corresponding portion of the inner helix, serves as the interaction circuit. The outer helix also comprises transducer end portions 48A and 48B along which the pitch is different from that along the intermediate portion 48C. The two ends of the inner helix 47 advantageously are extended beyond the ends of the outer helix and made reflectionless as in the tube described earlier. Coaxial transmission lines 53, 54 are coupled to the ends of the two transducer portions 48A, 48B for supplying and abstracting wave energy therefrom. Such coupling is shown schematically as the extension of each end of the outer helix through the tube envelope for connection to the inner conductor of the corresponding coaxial line. In this case, since excitation of the out-of-phase or slow mode of the interaction circuit is desired, the pitch of each transducer portion of the outer helix is smaller than that along the intermediate portion to provide along such portion a characteristic phase velocity slower than that of the corresponding portion of the inner helix. The transducer portions are again half a beat wavelength long and the characteristic phase propagation constants of the two component helices chosen so that at the half beat wavelength point there is a transfer of half the power applied initially to the end of one of the two helices.

The design considerations applicable here are similar to those discussed above, the principal difference residing in the excitation initially of the slower helix. It is feasible, for example, to employ in this tube the coupled helix arrangement included in the tube of Fig. 1 if provision is made to apply the input signal and abstract the output signal from the ends of the inner of the two helices.

In this tube, too, provision is made to minimize the effect of reflections by providing a helical ferrite element which surrounds the two helices and is immersed in the longitudinal magnetic field used for focusing. Alternatively, if periodic focusing be employed, a succession of helical ferrite sections is used for providing unidirectional loss.

In each of the tubes described, the transducer sections essentially were used to divide the energy applied at one end of one component thereof equally between the two components thereof over its length. In a traveling wave tube which utilizes only a single helix it is important to concentrate the signal energy in the single line. As indicated briefly earlier, a wide band complete energy transfer can be made from one helix to another if there is combined a transducer which includes a first section which is used to divide energy applied to one helix equally with the other helix and a second section in which the equal energies in the two helices are concentrated into said other helix. It is characteristic of coupled helices arrangements of this kind that substantially all of the energy applied to the one helix is transferred to the other helix over a very wide frequency range. Such wide band coupling connections advantageously minimize the reflection of undesirable noise components back and forth along the circuit.

In the traveling wave tube 60 shown in Fig. 3, an evacuated envelope 61 houses the various tube details. At one end, an electron gun 62, for example, of the kind used in the tube of Fig. 1, serves as the source of a solid electron beam of circular cross section. At the opposite end, an electrode 63 collects the spent beam. Means (not shown) are used to provide a longitudinal magnetic field used to keep the flow cylindrical therebetween. The inside wall of the tube envelope supports the inner helix 64 which advantageously is of uniform pitch and diameter and extends coaxially with the path of flow. The input transducer comprises a helix 67 supported by the outside wall of the tube envelope for surrounding a portion of the inner helix 64 slightly in from its upstream end. As is usual for maximum coupling efficiency, the sense of the winding of the outer helix 67 is opposite to that of the inner helix 64. The outer helix includes a first portion 67A half a beat wavelength long of a substantially uniform first pitch which provides a characteristic phase velocity thereto faster than that of the inner helix. This section corresponds, for example, to the input transducer section of the tube shown in Fig. 1 and is designed to result in an excitation at its downstream end which corresponds to equal power division between the two helices of the power applied at the input or upstream end of the helical section 67A by a coaxial line 71 in the manner previously described. The coaxial line 71 is connected to an input source at its other end.

The outer helix 67 further includes an intermediate portion 67B which has a characteristic phase velocity therealong synchronous with that of the inner helix. This intermediate portion is preferably about a sixth of the local synchronous beat wavelength, although a wider latitude in this dimension than in the others is tolerable. This section can, for example, be eliminated or made longer, depending on the quality of match and bandwidth desired.

This intermediate section serves to compensate for the fact that the beat wavelength is a function of the operating frequency, so that it is impossible for the first section 67A to be exactly half a beat wavelength over the entire band of operation. In particular, the insertion of an intermediate synchronous section which is approximately a sixth beat wavelength at the midfrequency of the operating band is found to extend the useful range of the coupling connection.

The outer helix 67 further includes a half beat wavelength section 67C in which the characteristic phase velocity is slower than that of the inner helix. This section is designed in the manner of the half beat wavelength section 67A except that in this case the outer helix is made the slower. As a consequence, for equal excitation of the two helices in their intermediate synchronous portions, the wave energy will be entirely concentrated on the inner helix 64 along the portion of its length extending beyond the portion which is coupled to helix section 67C. As a consequence, the input wave energy supplied initially by the input line 71 to the upstream end of the outer helix 67 is transferred completely to the inner helix 64 for propagation therealong.

In the region of the inner helix which corresponds to a single wire, the traveling wave and electron beam are made to interact in the manner characteristic of the usual form of helix-type traveling valve tube. To this end, the pitch of the helix and the accelerating potential applied thereto are adjusted so that the axial velocity of the wave is substantially equal to the electron velocity. This region of the inner helix is a plurality of operating wavelengths long. Additionally, this interacting circuit is made lossy, at least in the direction from the output end to the input end to suppress the effect of any reflections which may be set up. This may be accomplished readily in the manner previously described for the tubes shown in Figs. 1 and 2 by the use of a helical ferrite element (not here shown). Also to minimize reflection effects, the upstream end of the inner helix and the downstream end of the outer helix 67 are terminated, as shown schematically by the resistances 72, to be substantially reflectionless.

The output wave which is initially on the input helix is transferred for easier accessibility by an output coupling connection to the output helix 69 which resembles the outer helix 67, comprising sections 69A, 69B and 69C corresponding respectively to sections 67A, 67B and 67C of the helix 67. The outer helix 69 is terminated at its upstream end and the inner helix at its downstream end, as shown schematically by the resistances 74. The downstream end of the outer helix is connected to the inner conductor of coaxial line 73 which leads to the load.

It will be obvious to one skilled in the art that either or both the input helix 67 and the output helix 69 may have the order of its two non-synchronous end sections interchanged. In the case where coupling connection is to be made to a coaxial line as depicted here, it is advantageous from the standpoint of improving the match between helix and coaxial line at the junction thereof to have the helix be of large pitch at its portion adjacent the junction. When the coupling connection is to be made to a hollow rectangular wave guide by way of a coupling strip or antenna-like probe extending into the wave guide, it is similarly advantageous ordinarily to have the helix be of large pitch at its portion adjacent the hollow wave guide.

It is to be understood, as discussed above, that the specific embodiments described are merely illustrative of the general principles of the invention. Various other arrangements may be devised by one skilled in the art without departing from the spirit and scope of the invention. In particular, although the invention has been described with specific reference to coupled lines comprising a pair of coupled helices, the same principles are applicable, for example, to coupled lines comprising a pair of hollow wave guides in which it is sought to excite a specified pure normal mode by driving initially only a single one of the two wave guides, or where a complete power transfer between the two wave guides is to be made as was the case in the tube shown in Fig. 3.

What is claimed is:

1. In combination, first and second transmission lines coupled to one another over a coupling region which is characterized in that over one finite portion of its length the characteristic phase velocities of the two lines are substantially synchronous and over an adjacent portion half a beat wavelength long the characteristic phase velocities of the two lines are non-synchronous and result in a maximum power transfer therebetween of half the power applied to one of the lines, and means for introducing a signal solely onto one of said coupled transmission lines.

2. In combination, a first pair of coupled transmission lines which are to be excited in a pure normal mode, a transducer section for launching a pure normal mode in the first pair of coupled lines comprising a pair of coupled lines half a beat wavelength long forming extensions of the first pair of coupled lines and having characteristic phase velocities which are non-synchronous and result in a transfer of half the power applied to the free end of either component line of the transducer to each of the two lines forming the first pair of coupled lines, and means for introducing a signal solely onto one of said coupled lines comprising said transducer section.

3. In combination, first and second helices wound in opposite senses and coaxial with one another over a coupling region which is characterized in that over a first portion of its length the two helices are synchronous and over a second portion continuous with said first portion and half a beat wavelength long the two helices are non-synchronous and result in a maximum power transfer therebetween of half the power applied to one of said helices, and means for introducing a signal solely onto one of said helices which form said non-synchronous portion.

4. In a traveling wave tube, an electron source for providing an electron beam, a wave interaction circuit for propagating the traveling wave in energy exchange relation with said electron beam comprising a pair of synchronous helices coaxial with one another and wound in opposite senses, a transducer supplied with input signals for launching a pure normal mode on the interaction circuit comprising a pair of non-synchronous helices of substantially uniform pitch half a beat wavelength long connected electrically to the synchronous pair of helices forming the interaction circuit, and means for introducing an input signal solely onto one helix of said pair of non-synchronous helices.

5. In a traveling wave tube, an electron source for providing an electron beam, a wave interaction circuit for propagating a traveling wave for interaction with the electron beam comprising a pair of synchronous coupled helices wound in opposite senses and coaxial with the electron beam, a transducer to be excited with an input signal for launching a pure normal mode on the synchronous coupled helices comprising a pair of non-synchronous coupled helices forming a continuous waveguiding path with the wave interaction circuit, the two non-synchronous helices being characterized by a substantially uniform difference in characteristic phase propagation properties for a distance substantially equal to half a beat wavelength, and means for introducing an input signal solely onto one of said coupled helices comprising said transducer.

6. In a traveling wave tube, an electron source providing an electron beam, a pair of coupled helices wound in opposite senses and coaxial with the electron beam, said pair of helices being synchronous along one portion of their common axis and non-synchronous and of substantially uniform pitch along a half beat wavelength portion of their common axis contiguous with the synchronous portion, and an external transmission line coupled solely to one of the two helices at the end of its non-synchronous portion which is remote from the end contiguous with the synchronous portion.

7. In a traveling wave tube, an electron source providing an electron beam, first and second coupled helices wound in opposite senses and coaxial with the electron beam, the first helix being of substantially uniform pitch along its entire length, the pair of helices being synchronous along one portion of their common axis and non-synchronous along a half beat wavelength portion of their common axis contiguous with the synchronous portion, and an external transmission line coupled to the second helix only at the end of its non-synchronous portion remote from the end contiguous to its synchronous portion.

8. In a longitudinal field type traveling wave tube, an electron source for providing an electron beam, a pair of coupled helices wound in opposite senses and coaxial with the electron beam, the pair of helices being synhcronous along a major intermediate portion of their common axis and non-synchronous along half beat wavelength end portions of their common axis, and external transmission lines coupled solely to the ends of the faster of the coupled helices.

9. In a longitudinal field type traveling wave tube, an electron source for providing an electron beam, an inner helix of substantially uniform pitch coaxial with the electron beam, an outer helix coaxial with an electron beam in coupling relation with the inner helix and having a major intermediate portion of uniform pitch synchronous with the first helix and end portions half a beat wavelength long of substantially uniform pitch larger than that along said uniform intermediate portion, and external transmission lines coupled solely to the ends of said outer helix.

10. In a transverse field traveling wave tube, an electron source providing an annular electron beam, first and second coupled helices wound in opposite senses and coaxial with the electron beam, the first helix being within and the second helix being without the electron beam, the pair of helices being synchronous along a major intermediate portion of their common axis and non-synchronous along half beat wavelength end portions of their common axis, and external transmission lines coupled solely to the ends of the slower of the two helices.

11. In a transverse field traveling wave tube, an electron source for providing an annular electron beam, an inner helix enclosed by the electron beam having a uniform pitch along its length, a second helix surrounding the electron beam in field coupling relation with the first helix and having an intermediate portion of uniform pitch synchronous with the first helix and end portions half a beat wavelength long of a substantially uniform pitch smaller than that of said intermediate portion, and coupling connections to the ends of said second helix only.

12. In a transverse field type traveling wave tube, an electron source providing an electron beam, an inner helix coaxial with and surrounded by the electron beam of substantially uniform pitch, an outer helix surrounding and coaxial with the electron beam being synchronous with the inner helix along the major intermediate portion of their common axis and being non-synchronous along half beat wavelength end portions of their common axis, the difference in characteristic phase propagation constants along said end portions being substantially uniform and providing a maximum of half power transfer, and external transmission lines coupled to the ends of said outer helix only.

13. In a traveling wave tube, an electron source for providing an electron beam, a helix for propagating an electromagnetic wave in field coupling relation with the electron beam, and a transducer for launching an input wave on said helix comprising a second helix surrounding an end portion of said first helix and having two end portions non-synchronous with the first helix of approximately a half beat wavelength long spaced apart by an intermediate portion synchronous with the first helix, and an external transmission line coupled to one end of said second helix only.

14. In a traveling wave tube, an electron source for providing an electron beam, a first helix for propagating an electromagnetic wave in field coupling relation with the electron beam, and a transducer for launching an input wave on said first helix comprising a second helix surrounding an end portion of said first helix having one end portion half a beat wavelength long of characteristic phase velocity faster than that of the coaxial portion of the first helix, an intermediate portion of characteristic phase velocity synchronous with that of the coaxial portion of the first helix, and the other end portion half a beat wavelength long of a substantial uniform characteristic phase velocity slower than that of the coaxial portion of the first helix, and an input transmission line coupled to one end of said second helix only.

15. A traveling wave tube according to claim 14 further characterized in that the intermediate portion of the second helix which is synchronous with the coaxial portion of the first helix is substantially one sixth a synchronous beat wavelength long.

16. In combination, first and second transmission lines coupled to one another over an extended region, an input circuit to said coupled lines consisting of means for supplying wave energy to one end of only the first of said transmission lines, and means for transferring half of said wave energy into an electric field along the second transmission line at a predetermined phase with respect to the electric field of the wave energy remaining on the first line, said last-mentioned means including a portion of the coupled transmission lines extending a distance of a half beat wavelength over which the two lines are non-synchronous.

17. In combination, first and second helical conductors coupled to one another over an extended region, an input circuit to said coupled helices consisting of means for supplying wave energy to one end of only the first of said helical conductors, and means for transferring half of said wave energy into an electric field along the second helical conductor at a predetermined phase relationship with respect to the electric field of the wave energy remaining on the first helical conductor, said last-mentioned means including a portion of the coupled helices extending a distance of a half beat wavelength over which the two helices present a substantially uniform difference in characteristic velocity constants, and result in a maximum energy transfer therebetween of half the energy applied to the first helical conductor.

18. In combination, first and second helical conductors coupled to one another over an extended region, an input circuit to said coupled helices consisting of means for supplying wave energy to one end of only the first of said helical conductors, and means for transferring half of said wave energy into an electric field along the second helical conductor at a predetermined phase relationship with respect to the electric field of the wave energy remaining on the first helical conductor, said last mentioned means including a portion of the coupled helices which is characterized in that over one finite part of its length the characteristic phase velocities of the two helices are substantially synchronous and over an adjacent part half a beat wavelength long the characteristic phase velocities of the two helices are substantially uniform and non-synchronous and result in a maximum energy transfer therebetween of half the energy applied to the first helical conductor.

References Cited in the file of this patent

UNITED STATES PATENTS

| | | |
|---|---|---|
| 2,588,832 | Hansell | Mar. 11, 1953 |
| 2,652,513 | Hollenberg | Sept. 15, 1953 |
| 2,707,759 | Pierce | May 3, 1955 |
| 2,725,499 | Field | Nov. 29, 1955 |
| 2,726,291 | Quate | Dec. 6, 1955 |
| 2,773,213 | Dodds | Dec. 4, 1956 |
| 2,823,333 | Quate | Feb. 11, 1958 |